Jan. 11, 1927.                                        1,613,752
R. HINDS
COMBINATION INTRODUCING DEVICE FOR QUEEN BEES
Filed April 27, 1926
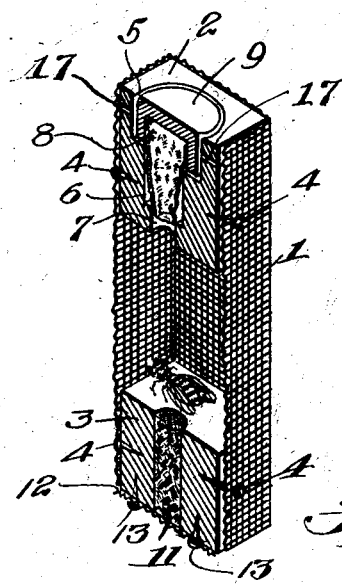
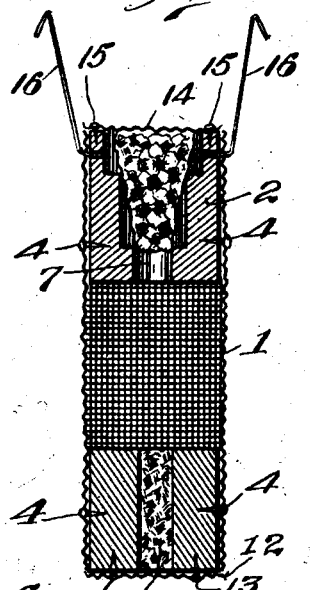
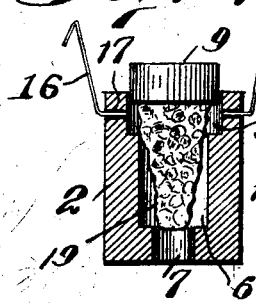
INVENTOR.
Raymond Hinds.
BY
ATTORNEYS.

Patented Jan. 11, 1927.

1,613,752

UNITED STATES PATENT OFFICE.

RAYMOND HINDS, OF WAYMART, PENNSYLVANIA.

COMBINATION INTRODUCING DEVICE FOR QUEEN BEES.

Application filed April 27, 1926. Serial No. 104,938.

This invention relates to a combination introducing device for queen bees.

The object of the invention is the construction of a simple and efficient device for holding a queen-cell, containing a queen larva, permitting the queen to hatch, then confining the queen and at the same time providing food for her, until she acquires the odor of the colony, and then at the will of the operator the queen may be released into the hive, among the bees of the colony.

Another object of the invention is the construction of a device comprising an improved queen-cell protector associated with a novel queen cage, in which queen cage is a food carrying block, which when the food is exhausted, permits a queen to pass therethrough and mingle with the bees of a colony, in the hive in which my device is positioned.

A still further object of the invention is the construction of an efficient queen-cell protector which may be in the nature of a block, as shown in the accompanying drawings, and in which is constructed peculiar means for supporting a queen-cell cup.

With the foregoing and other objects in view, my invention comprises certain novel constructions, combinations, and arrangements of parts as will be hereinafter fully described, illustrated in the accompanying drawings and more particularly pointed out in the appended claims.

In the drawings:

Figure 1 is a vertical central sectional view of a device constructed in accordance with the present invention, showing a queen-cell cup mounted therein, with an empty queen-cell in the cup.

Figure 2 is a vertical central sectional view of my device showing a queen-cell which has been cut from the comb and in which instance no queen-cell cup is used.

Figure 3 is a vertical central sectional view of my device, showing the same as when used to introduce a queen to a colony that is hard to introduce a queen bee to, under such conditions as when there are laying workers in the colony.

Figure 4 is a vertical sectional view of the queen-cell supporting block, or "cell protector", showing a cup and queen-cell therein.

Figure 5 is a vertical sectional view of my cage and food carrying block in position upon the comb and surrounding or enclosing a queen-cell thereon.

Figure 6 is a perspective view of a piece of wire mesh, used in my device as a closure.

Figure 7 is a perspective view of a piece of a queen excluder.

Referring to the drawings by numerals, 1 designates a wire mesh cage which is preferably square in cross section. In one end of this open ended cage, I place a queen-cell supporting block 2, and in the other end of the cage, I place a food supporting block 3. These blocks 2 and 3 are fastened in cage 1 by, preferably tacks 4.

The term "block", as used in this specification and claims is employed in a generic sense, as well as the term "cage."

The queen-cell supporting block 2 is provided with an outer compartment 5, a central compartment 6 and an inner compartment 7; at the contiguous ends of compartments 5 and 6 is formed an annular supporting ledge 8, upon which may be supported the queen-cell cup 9 (Fig. 1), in which cup 9 is a queen-cell. The compartments 5, 6 and 7 vary in sizes; the outer compartment 5 is of a larger diameter than central compartment 6, because outer compartment 5 receives the cup 9, with the queen-cell extending into central compartment 6, as shown. When the queen hatches, she passes through inner compartment 7 into the central part of cage 1.

In the opposite end of cage 1 to that carrying block 2, I position the second or food block 3; this block 3 is provided with an open ended compartment 10 for permitting the queen, when desired, to pass through the block and escape from the device, as when introducing a queen into a colony. In compartment 10, I place suitable food, such as candy 11 for the queen and worker bees to feed upon.

A piece or strip of wire mesh 12 is preferably fastened by tacks 13 to the outer end of food supporting block 3, to keep the queen in the nursery-device until the operator decides to release her, and the closure or wire mesh 12 also keeps the worker bees from eating the candy, which eating, might in some instances, permit the queen to be released too soon.

If it is desired to take a queen-cell with a larva therein from the brood comb in the hive, this can be done, as is shown in Figure 2 of the drawings. In this figure, the queen-cell has been properly cut from the comb to which it was attached, and to prevent the worker bees from gnawing or injuring the cell, I fasten a piece of wire mesh 14, by tacks 15, over the outer end of block 2. Supporting wires 16, with their lower ends extending into apertures 17, of the block 2, are employed for fastening the device to a comb or brood frame. In the device shown in Figure 2, when the queen hatches, she will pass down into the compartment formed between the blocks, and will feed upon the candy 11 in the compartment 10 until she has acquired the odor of the colony and until the operator releases her, by merely removing wire mesh 12, if the queen has eaten all of the candy out of compartment 10, or permitting the worker bees to eat the candy and thereby assist the virgin queen to be released.

If the colony is believed to be hard to introduce a queen to by reason for instance, as having laying workers, a queen can be placed in the cage, shown in Figure 3, and the blocks either filled first with candy and then placed in the cage, or after the queen has passed through one of the blocks into the cage, the compartment of the block or blocks can then be filled with candy, with a queen excluder 18 fastened over the inner end of compartment 10 of block 3. Now the workers will eat the candy out of the compartment 10, sooner than out of the block 2, and will associate with the queen, but the queen will not be permitted to escape into the hive proper until the candy has been eaten out of the compartments in block 2, whereby the queen will attain the odor of the colony, and at the same time some of the worker bees will get acquainted with her by going through compartment 10, and excluder 18 and coming in contact with the queen in the cage 1.

If it is desired to merely introduce a virgin queen into a hive (colony), then block 2 is fastened or suspended from a brood comb by wires 16, fastened at one end in apertures 17, with the queen-cell cup 9 in compartment 5. This block 2 and cup 9 protect the queen-cell 19 against the bees gnawing the same, and when the queen hatches, she will pass through inner compartment 7 and mingle with the bees of the colony. In Figure 4, I have shown an exceptionally large queen cell, while in Figure 1, I have shown a standard size. The peculiar sizes, or varying sizes of compartments 5, 6 and 7 cause the queen-cell to be efficiently and tightly held within the block 2 against rattling or unnecessary movement, which is a great advantage of my device; this is true with the illustrations in Figures 1, 2 and 4.

In Figure 5, I show the cage 1 pressed against the brood comb 20, to which is attached the queen-cell 21, and by fastening and supporting wires 16, the cage 1 is attached to the comb, permitting the virgin queen to hatch and be kept in the cage 1 until the operator releases her. She will be supplied with food or candy 11 in block 3, while being confined. This device affords admirable means for capturing virgin queens that hatch from queen-cells right on the comb or brood frame.

It is to be understood that my device can be used to introduce queens and set them at liberty at a desired time, particularly when the bees are quiet. The device can be used for introducing queen cells, being used as a protector to keep the bees from gnawing into and tearing down the cells as occurs at certain times of the year. It can be used as a queen nursery cage to allow the queen to hatch in and keep her safe for future use.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. A device of the class described, comprising a queen-cell supporting means provided with a wire receiving aperture in its side, and a supporting wire in said aperture and adapted to support said supporting means upon a comb or a brood frame.

2. A device of the class described, comprising protecting and queen-cell supporting means, and detachable means in the side of said supporting means for supporting the same upon a comb or brood frame.

3. A device of the class described, comprising a block provided with internal means for supporting a queen-cell carrying cup, said block provided with means for entirely enclosing a queen-cell carried by said cup; said block provided at opposite sides with wire-receiving apertures arranged in substantially horizontal positions, and supporting wires provided on their inner ends with angularly disposed portions in said receiving apertures and with angularly disposed outer ends.

4. As a new article of manufacture, a queen bee introducing device, comprising a wire mesh cage provided with blocks entirely within its ends, said blocks having their outer ends flush with the outer ends of said wire mesh cage, each block having openings extending therethrough, one of said blocks provided with means in communication with its opening for receiving and supporting entirely within the block a queen-cell cup, said cup having its outer face flush with one end of the cage and the outer end of the engaged block, and a piece of flat mesh fastened over the outer end of the other block flush with one end of said cage and normally closing the opening in this last-mentioned block.

5. As a new article of manufacture, an introducing device for queen bees, comprising a block provided at its outer end with a queen-cell cup-receiving compartment for holding the entire cup, said block provided with a central compartment of less diameter than said outer compartment for holding and surrounding the entire projecting portion of a queen-cell depending from said cup, and said block provided with an inner compartment of less diameter than said central compartment and acting as an outlet for said central compartment and opening at its inner end upon said central compartment.

6. As a new article of manufacture, a queen-bee introducing device, comprising a block provided with internal means for entirely supporting a cup and a queen-cell between its ends, said block provided at opposite sides with receiving apertures, and removable means for fastening the block upon a comb or a brood frame mounted in said receiving apertures.

In testimony whereof I hereunto affix my signature

RAYMOND HINDS.